United States Patent
Bi et al.

(10) Patent No.: US 8,780,854 B2
(45) Date of Patent: Jul. 15, 2014

(54) METHOD AND APPARATUS FOR MULTIPLE FREQUENCY POINT MULTIPLE ACCESS

(75) Inventors: Feng Bi, Guangdong (CN); Wei Gou, Guangdong (CM); Ming Yuan, Guangdong (CN); Dezhong Mi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 412 days.

(21) Appl. No.: 13/393,139

(22) PCT Filed: Sep. 25, 2009

(86) PCT No.: PCT/CN2009/074215
§ 371 (c)(1),
(2), (4) Date: Feb. 28, 2012

(87) PCT Pub. No.: WO2010/054569
PCT Pub. Date: May 20, 2010

(65) Prior Publication Data
US 2012/0183087 A1    Jul. 19, 2012

(30) Foreign Application Priority Data

Nov. 17, 2008 (CN) .......................... 2008 1 0177630

(51) Int. Cl.
| | |
|---|---|
| *H04W 4/00* | (2009.01) |
| *H04W 72/04* | (2009.01) |
| *H04L 5/00* | (2006.01) |
| *H04W 28/26* | (2009.01) |

(52) U.S. Cl.
CPC ............. *H04W 72/042* (2013.01); *H04L 5/003* (2013.01); *H04W 28/26* (2013.01)
USPC ............................ 370/330; 370/436; 370/478

(58) Field of Classification Search
None
See application file for complete search history.

(56) References Cited

U.S. PATENT DOCUMENTS

| | | | |
|---|---|---|---|
| 8,054,786 B2 | 11/2011 | Wu et al. | |
| 2007/0002800 A1* | 1/2007 | Sondur et al. | 370/332 |

(Continued)

FOREIGN PATENT DOCUMENTS

| | | |
|---|---|---|
| CN | 1889759 A | 1/2007 |
| CN | 101123600 A | 2/2008 |
| CN | 101247165 A | 8/2008 |

OTHER PUBLICATIONS

3GPP, "3rd Generation Partnership Project; Technical Specification Group Radio Access Network; Evolved Universal Terrestrial Radio Access (E-UTRA); LTE Physical Layer—General Description (Release 8)", 3GPP TS 36.201 V8.1.0, Nov. 2007, Valbonne, France.

*Primary Examiner* — Ian N Moore
*Assistant Examiner* — Eric P Smith
(74) *Attorney, Agent, or Firm* — Christopher L. Parmelee; Walker & Jocke (57) ABSTRACT

The present invention discloses a method and apparatus for multiple frequency point multiple access, which method comprises: in the situation that a system comprises a plurality of working frequency points, configuring a multi-access mode for the sending of uplink information and the sending of downlink information of each working frequency point in a plurality of working frequency points respectively; and each working frequency point performing the sending of the uplink information and the sending of the downlink information according to the configured multi-access modes. By way of the above technical solution, a simple multi-access mode is provided, which ensures the link performance of the working frequency point, improves the throughput of the entire network, and at the same time takes the problem of system peak average power ratio into account.

2 Claims, 5 Drawing Sheets

(56) References Cited

U.S. PATENT DOCUMENTS

| | | |
|---|---|---|
| 2007/0286147 A1* | 12/2007 | Wang et al. .................... 370/344 |
| 2008/0144612 A1* | 6/2008 | Honkasalo et al. ........... 370/370 |
| 2008/0165724 A1* | 7/2008 | Wu et al. ....................... 370/320 |
| 2009/0274109 A1* | 11/2009 | Zhang et al. .................. 370/329 |
| 2010/0034152 A1* | 2/2010 | Imamura ....................... 370/329 |
| 2010/0118810 A1* | 5/2010 | Qu et al. ....................... 370/329 |

* cited by examiner

METHOD AND APPARATUS FOR MULTIPLE FREQUENCY POINT MULTIPLE ACCESS

FIELD OF THE INVENTION

The present invention relates to the communication field and, in particular, to a method and apparatus for multiple frequency point multiple access.

BACKGROUND OF THE INVENTION

In an orthogonal frequency division multiplexing (OFDM) system, the orthogonal frequency division multiplexing divides a data stream into several sub-data streams, with each sub-data stream having a relatively low bit rate, and the orthogonal frequency division multiplexing modulates each sub-data stream onto a corresponding subcarrier respectively to send them in parallel, wherein each OFDM subcarrier is not only orthogonal to each other but also has a ½ overlapping.

In a long term evolution (LTE) system, it needs to sufficiently take the peak average power ratio (PAPR) problem of the user terminals (UT) into account, i.e. the instantaneous value of the output signal of the transmitter will have relatively large fluctuation, which will require some components (such as power amplifier, Add/Drop (A/D) converter, Digital-to-Analog (D/A) converter, etc.) in the system to have very large linear dynamic range. And the nonlinearity of these components will also cause the signal with relatively large dynamic range to generate nonlinear distortion. The generated harmonic waves will cause the sub-channels to interfere each other, thus affecting the performance of the OFDM system.

In the LTE system, due to the problem of PAPR, the multi-access mode of sending uplink information uses SC-FDMA. It is because the information symbol of the single carrier system is directly modulated onto the time domain (or some simple deformations), so its PAPR is relatively low. However in a multicarrier system, because there are a plurality of carriers transmitting information symbols simultaneously, and the information symbols carried by each carrier are independent from each other, the PAPR of the multicarrier system is larger than the PAPR of the single carrier system by 2 to 3 dB. High PAPR increases the requirements for power amplification linearly; however, this is very disadvantageous for the UT. Therefore, the best choice of uplink multi-access is a single carrier system with a cycle prefix, i.e. SC-FDMA.

Currently, the research of multi-access based on the OFDM system is a hot spot. But, there is very little research regarding the multi-access mode with a plurality of working frequency points. Taking an LTE system for example, its downlink uses OFDMA, its uplink uses SC-FDMA, and there is only one working frequency point in the system. However, this solution cannot be well suitable for a system which has a plurality of working frequency points (such as LTE-Advanced system and IMT-Advanced system). Therefore, currently it urgently needs a technical solution for multi-access mode when there are a plurality of working frequency points in the system.

SUMMARY OF THE INVENTION

The present invention is proposed regarding the problem in the related art that still no technical solution for multi-access mode with a plurality of working frequency points in the system is proposed. For this end, the main object of the present invention is to provide a method and apparatus for multiple frequency point multiple access so as to solve the above problem existing in the related art.

A method for multiple frequency point multiple access is provided according to one aspect of the present invention.

The method for multiple frequency point multiple access according to the present invention comprises: in the situation that a system comprises a plurality of working frequency points, configuring a multi-access mode for the sending of uplink information and the sending of downlink information of each working frequency point in a plurality of working frequency points respectively; and each working frequency point performing the sending of the uplink information and/or the sending of the downlink information according to the configured multi-access modes.

In this case, as to each working frequency point, the multi-access mode configured for the sending of its uplink information is at least one of: single carrier frequency division multiple access, i.e. SC-FDMA, orthogonal frequency division multiple access, i.e. OFDMA, clustered single carrier frequency division multiple access, i.e. clustered SC-FDMA, and NxSC-FDMA.

In addition, after performing multi-access mode configuration to a plurality of working frequency points, the above method further comprises: allocating a plurality of working frequency points to a terminal.

In addition, after allocating a plurality of working frequency points, it further comprises: configuring a predetermined working frequency point in a plurality of working frequency points as an initial access working frequency point of the terminal, wherein the multi-access mode of the sending of the uplink information of the initial access working frequency point is SC-FDMA, and the multi-access mode of the sending of the downlink information is OFDMA; and after accessing the initial access working frequency point, the terminal acquiring the multi-access modes used when a plurality of working frequency points send the uplink information and downlink information according to a system message received thereby and adjusting a current working frequency point of the terminal according to the multi-access mode supported by the terminal itself.

In this case, the process of a terminal which is located in an old system performing current working frequency point adjustment in the terminal is in particular: adjusting the current working frequency point to the working frequency point used in the SC-FDMA multi-access mode to send the uplink information and used in the OFDMA multi-access mode to send the downlink information.

An apparatus for multiple frequency point multiple access is provided according to another aspect of the present invention.

The apparatus for multiple frequency point multiple access according to the present invention comprises: a configuration module adapted for, in the situation that a system comprises a plurality of working frequency points, configuring a multi-access mode for the sending of uplink information and the sending of downlink information of each working frequency point in a plurality of working frequency points respectively; and a sending module adapted for performing the sending of the uplink information and the sending of the downlink information on a plurality of working frequency points according to the multi-access mode configured by the configuration module.

In this case, the multi-access mode is at least one of: single carrier frequency division multiple access, i.e. SC-FDMA, orthogonal frequency division multiple access, i.e. OFDMA, clustered single carrier frequency division multiple access, i.e. clustered SC-FDMA, and NxSC-FDMA.

In addition, the above apparatus further comprises: an allocation module adapted for allocating a plurality of working frequency points to a terminal.

In addition, the configuration module further comprises: an initial access configuration submodule adapted for configuring a predetermined working frequency point in a plurality of working frequency points as an initial access working frequency point of the terminal, wherein the multi-access mode of the sending of the uplink information of the initial access working frequency point is SC-FDMA, and the multi-access mode of the sending of the downlink information is OFDMA; and an notification submodule adapted for sending a system message to a terminal after the terminal accesses the initial access working frequency point, wherein the system message carries the multi-access modes used when a plurality of working frequency points send the uplink information and downlink information to enable the terminal to adjust the current working frequency point of the terminal according to the multi-access mode supported by the terminal itself.

In addition, the allocation module is further adapted for, as to a terminal which is located in an old system in the terminal, adjusting the current working frequency point to the working frequency point used in the SC-FDMA multi-access mode to send the uplink information and used in the OFDMA multi-access mode to send the downlink information.

By way of the technical solution of the present invention, the problem that the currently available single multi-access mode is not completely suitable for the situation that there are a plurality of working frequency points and the problem that the currently available system only takes PAPR and the link performance into account and causes the link performance to reduce are solved by configuring different or the same multi-access modes for the sending of the uplink/downlink information of each working frequency point. And a simple multi-access mode is provided. It ensures the link performance of the working frequency point, improves the throughput of the entire network, and also takes the problem of system PAPR into account.

Other features and advantages of the present invention will be described in the following description and partly become obvious from the description, or can be understood by implementing the present invention. The objects and other advantages of the present invention can be realized and obtained through the structures specially indicated in the description, claims and drawings.

BRIEF DESCRIPTION OF THE DRAWINGS

The drawings herein are used to provide a further understanding of the present invention and form a part of the specification, which are used to explain the present invention together with the embodiments of the present invention without unduly limiting the scope of the present invention. In the drawings.

DETAILED DESCRIPTION OF THE EMBODIMENTS

Summary of Functions

When the system contains a plurality of working frequency points, the currently available single multi-access mode cannot be well applied. Therefore, the present invention provides a technical solution regarding different requirements of different systems and different capabilities of different terminals. In a system with a plurality of working frequency points, since the components in a high-end UT have very large dynamic range, such terminal generally will not take the PAPR problem into account. In order to better obtain link performance and the throughput of the entire network, in uplink, the information sending at some working frequency points can use the form of single carrier frequency division multiple access (SC-FDMA), the information sending at some working frequency points can use the form of orthogonal frequency division multiple access (OFDMA), the information sending at some working frequency points can use the form of clustered single carrier frequency division multiple access (clustered SC-FDMA), and the information sending at some working frequency points can use the form of NxSC-FDMA (N SC-FDMAs). And the information sending at some working frequency points can use 4 forms of SC-FDMA, OFDMA, clustered SC-FDMA, and NxSC-FDMA simultaneously. And the information sending of each working frequency point can also use the same multi-access mode. When sending downlink information, the information sending of each working frequency point preferably uses the form of OFDMA, and of course can use the above other multi-access modes, which is not limited by the embodiments of the present invention.

The preferred embodiments of the invention will be described in conjunction with the drawings. It shall be understood that the preferred embodiments described here are only for the purpose of illustration and not to limit the present invention.

Method Embodiments

Figure 1:
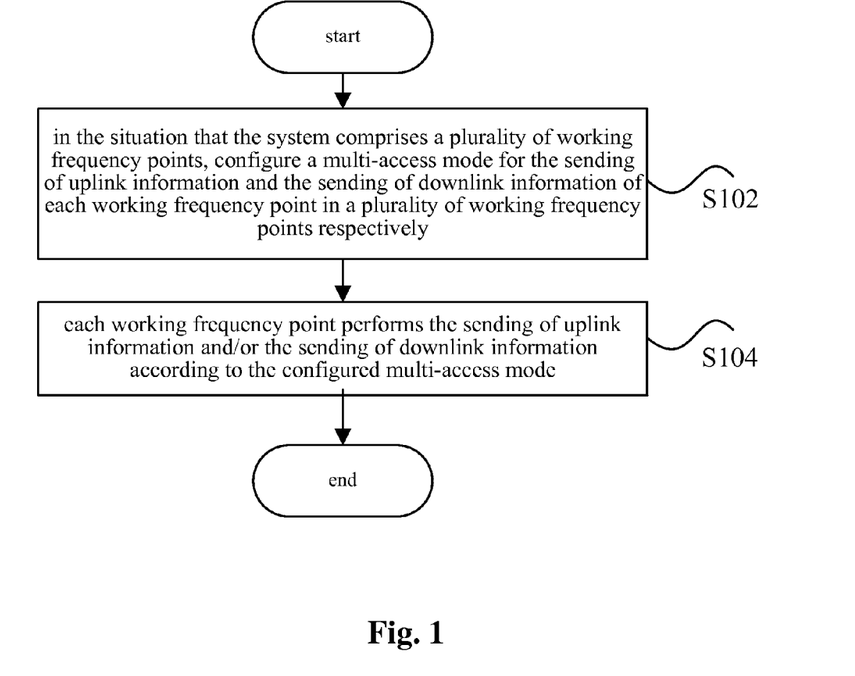
FIG. 1 is a flow chart of a method for multiple frequency point multiple access according to the embodiments of the present invention.

A method for multiple frequency point multiple access is provided according to the embodiments of the present invention. FIG. 1 is a flow chart of a method for multiple frequency point multiple access according to the embodiments of the present invention, and as shown in FIG. 1, the above method comprises the following process (steps S102 to S104).

Step S102: in the situation that a system comprises a plurality of working frequency points, configuring a multi-access mode for the sending of uplink information and the sending of downlink information of each working frequency point in the plurality of working frequency points respectively; that is, the uplink/downlink information sending of each working frequency point can use different or the same multi-access modes.

In this case, as to each working frequency point, the multi-access mode configured for its uplink information sending can be at least one of the following: SC-FDMA, OFDMA, clustered SC-FDMA, and NxSC-FDMA.

In application, a multi-access mode combined of SC-FDMA, OFDMA, clustered SC-FDMA, and NxSC-FDMA can be used. Specifically, the information sending at some working frequency points can use SC-FDMA, the information sending at some working frequency points can use OFDMA, the information sending at some working frequency points can use clustered SC-FDMA, the information sending at some working frequency points can use NxSC-FDMA, and the information sending at some working frequency points can use SC-FDMA, OFDMA, clustered SC-FDMA, and NxSC-FDMA simultaneously, and the information sending of each working frequency point can also use the same multi-access mode.

In addition, in step S102, the multi-access mode used by the information sending of each working frequency point is configurable, i.e. the multi-access mode used by the information sending of each working frequency point can change, and at the next moment, it can be configured to be other multi-access modes.

In step S102, after configuring the multi-access modes of a plurality of working frequency points, the working frequency points particularly allocated to an original system terminal and a new system terminal can be adjusted adaptively, i.e. allocating a plurality of working frequency points to different types of terminals. The particular steps of the above process includes the following steps.

1. Configuring a predetermined working frequency point in a plurality of working frequency points to be an initial access working frequency point of a terminal (for example, the center frequency point or one certain frequency point can be used as the initial access frequency point of the UT), wherein the multi-access mode of the uplink information sending of the initial access working frequency point can be SC-FDMA, and the multi-access mode of the downlink information sending can be OFDMA and can also be the above other multi-access modes.

2. After accessing the initial access working frequency point, the UT acquires the multi-access modes used when a plurality of working frequency points send the uplink information and downlink information according to a system message received thereby; and in particular, after accessing, according to the system information, the UT can learn that the information sending of some working frequency points uses SC-FDMA, the information sending of some working frequency points uses OFDMA, the information sending of some working frequency points uses clustered SC-FDMA, the information sending of some working frequency points uses NxSC-FDMA, the information sending of some working frequency points uses SC-FDMA, OFDMA, clustered SC-FDMA, and NxSC-FDMA simultaneously, and the information sending of some working frequency points uses the same multi-access mode.

3. The current working frequency point of the UT is adjusted according to the multi-access mode supported by the UT itself.

In addition, in order to be compatible with the old system, when a terminal which belongs to the old system adjusts the current working frequency point, the current working frequency point can be adjusted to the working frequency point used in the SC-FDMA multi-access mode to send the uplink information and used in the OFDMA multi-access mode to send the downlink information. Other types of terminals can operate on any working frequency point with different multi-access modes.

In addition, during application, the downlink information sending of each working frequency point can use different or the same multi-access modes. However, in order to be compatible with the old system, the downlink information sending of each working frequency point preferably is the form of OFDMA and of course can use the above other multi-access modes.

Step S104: each working frequency point performs the sending of the uplink information and/or the sending of the downlink information according to the multi-access mode configured for it.

Hereinafter, the above technical solution of the present invention will be described in conjunction with examples.

Example 1

Figure 2:
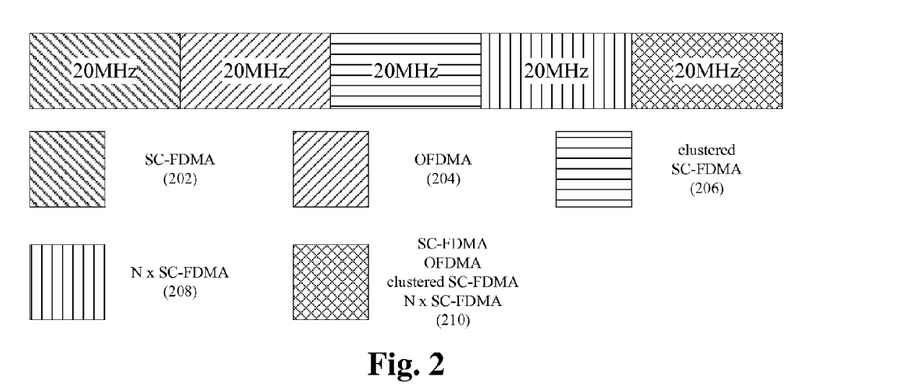
FIG. 2 is a schematic diagram of uplink multiple frequency point multiple access of example 1 of the method for multiple frequency point multiple access according to the embodiments of the present invention.
Figure 3:
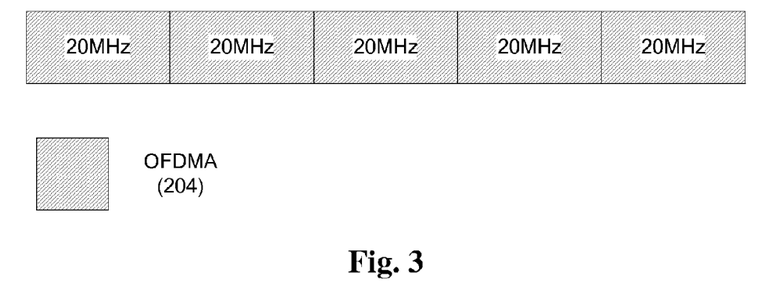
FIG. 3 is a schematic diagram of downlink multiple frequency point multiple access of example 1 of the method for multiple frequency point multiple access according to the embodiments of the present invention.

Take a 100 MHz bandwidth for example to illustrate and assume that the 100 MHz bandwidth consists of a collection of 5 20 MHz bandwidths, and they correspond to 5 working frequency points respectively. As shown in FIG. 2, in this case, the uplink multiple access can use the following solution:

the information sending of the first working frequency point can use SC-FDMA 202, the information sending of the second working frequency point can use OFDMA 204, the information sending of the third working frequency point can use clustered SC-FDMA 206, the information sending of the fourth working frequency point can use NxSC-FDMA 208, and the information sending of the fifth working frequency point can use SC-FDMA, OFDMA, clustered SC-FDMA, and NxSC-FDMA 210 simultaneously; and in order to be compatible with the old system, as shown in FIG. 3, the downlink multi-access can use the following solution:

the information sending of the first, second, third, fourth, and fifth working frequency point can all use OFDMA 204.

Example 2

Figure 4:
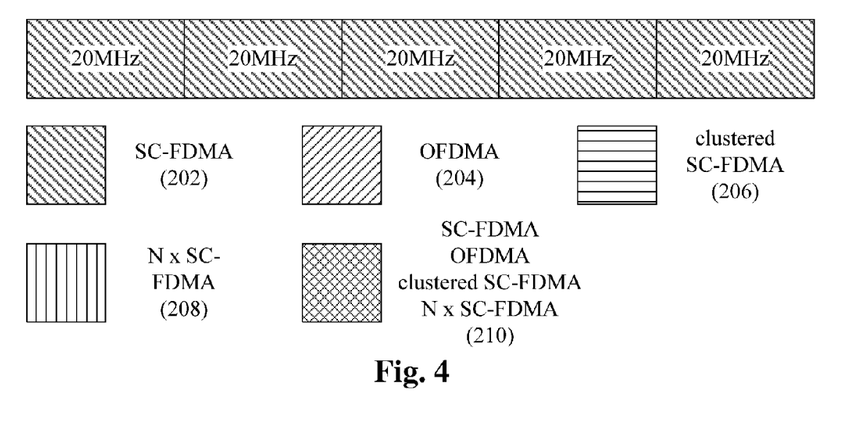
FIG. 4 is a schematic diagram of uplink multiple frequency point multiple access of example 2 of the method for multiple frequency point multiple access according to the embodiments of the present invention.

Take a 100 MHz bandwidth for example to illustrate, and assume that the 100 MHz bandwidth consists of a collection of 5 20 MHz bandwidths, and they correspond to 5 working frequency points respectively. As shown in FIG. 4, in this case, the uplink multiple access can use the following solution:

the information sending of the first, second, third, fourth, and fifth working frequency point can all use SC-FDMA 202.

In order to be compatible with the old system, as shown in FIG. 3, the downlink multi-access can use the following solution:

the information sending of the first, second, third, fourth, and fifth working frequency point can all use OFDMA 204.

Example 3

Figure 5:
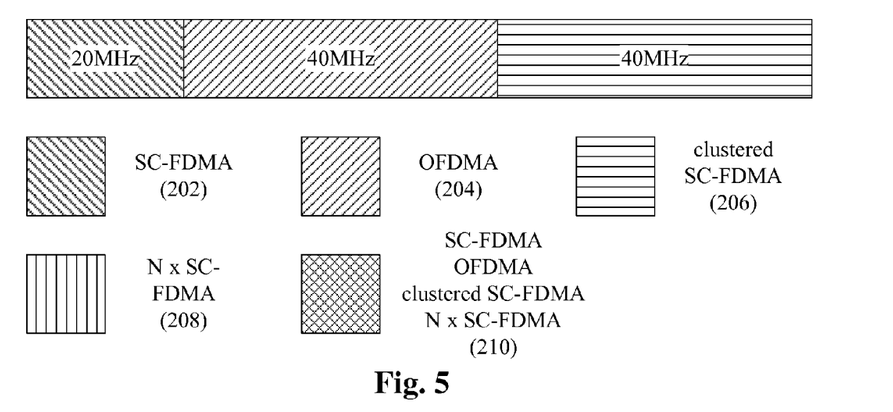
FIG. 5 is a schematic diagram of uplink multiple frequency point multiple access of example 3 of the method for multiple frequency point multiple access according to the embodiments of the present invention.

Take a 100 MHz bandwidth for example to illustrate and assume that the 100 MHz bandwidth consists of other bandwidth collections, for instance, consists of 20 MHz, 40 MHz, and 40 MHz collections, and they correspond to 3 working frequency points respectively. As shown in FIG. 5, in this case, the uplink multiple access can use the following solution:

the information sending of the first working frequency point can use SC-FDMA 202, the information sending of the second working frequency point can use OFDMA 204, and the information sending of the third working frequency point can use clustered SC-FDMA 206.

Figure 6:
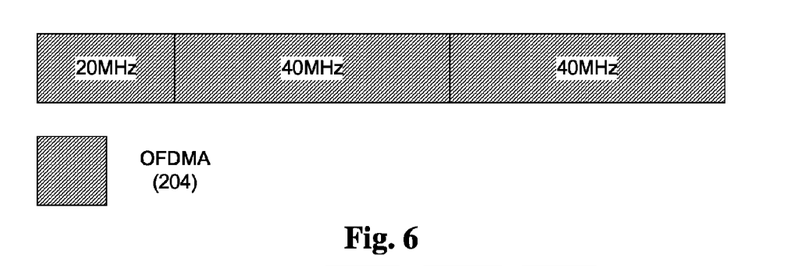
FIG. 6 is a schematic diagram of downlink multiple frequency point multiple access of example 3 of the method for multiple frequency point multiple access according to the embodiments of the present invention.

In order to be compatible with the old system, as shown in FIG. 6, the downlink multi-access can use the following solution:

the information sending of the first, second, and third working frequency point can all use OFDMA 204.

In addition, allocating which 20 MHz resource to the LTE can be adjusted adaptively. And the center frequency point or one certain frequency point can be used as the initial access frequency point of the UT. After accessing, according to the system information, the UT can learn that the information sending of some working frequency points uses SC-FDMA, the information sending of some working frequency points uses OFDMA, the information sending of some working frequency points uses clustered NxSC-FDMA, the information sending of some working frequency points uses SC-FDMA, OFDMA, clustered SC-FDMA, and NxSC-FDMA simultaneously, and the information sending of some working frequency points uses the same multi-access mode.

In order to be compatible with the old system (for example, the LTE-A system is compatible with the LTE system), the terminals of the LTE can use the working frequency point of SC-FDMA in uplink, and other types of terminals can work at any working frequency points in different multi-access modes.

In uplink, the Node-B can adjust the number of the working frequency points which use SC-FDMA, OFDMA, clustered SC-FDMA, or NxSC-FDMA in this case, and can schedule different UTs onto different working frequency points respectively according to such parameters as the type, coverage range, etc. of the UT which is communicating and is to communicate.

Figure 7:
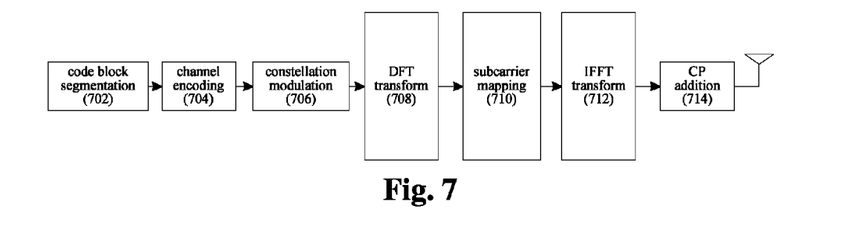
FIG. 7 is a schematic diagram of the structure of an SC-FDMA transmitter of the method for multiple frequency point multiple access according to the embodiments of the present invention.
Figure 8:
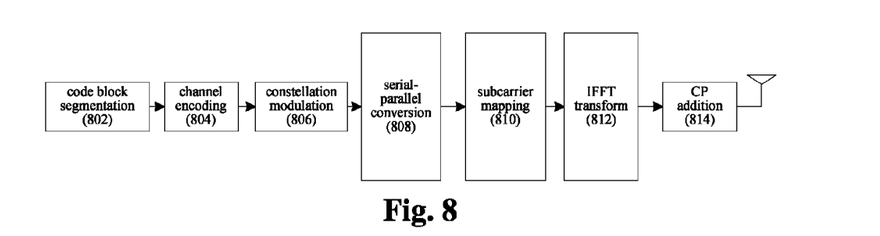
FIG. 8 is a schematic diagram of the structure of an OFDMA transmitter of the method for multiple frequency point multiple access according to the embodiments of the present invention.
Figure 9:
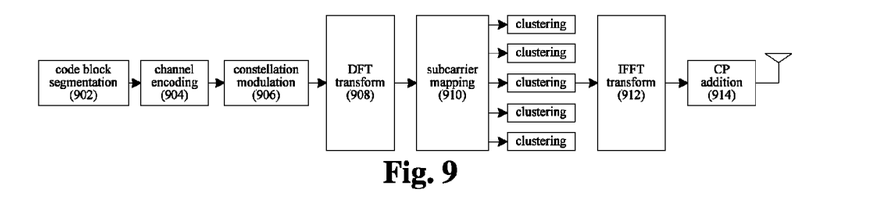
FIG. 9 is a schematic diagram of the structure of a clustered SC-FDMA transmitter of the method for multiple frequency point multiple access according to the embodiments of the present invention.
Figure 10:
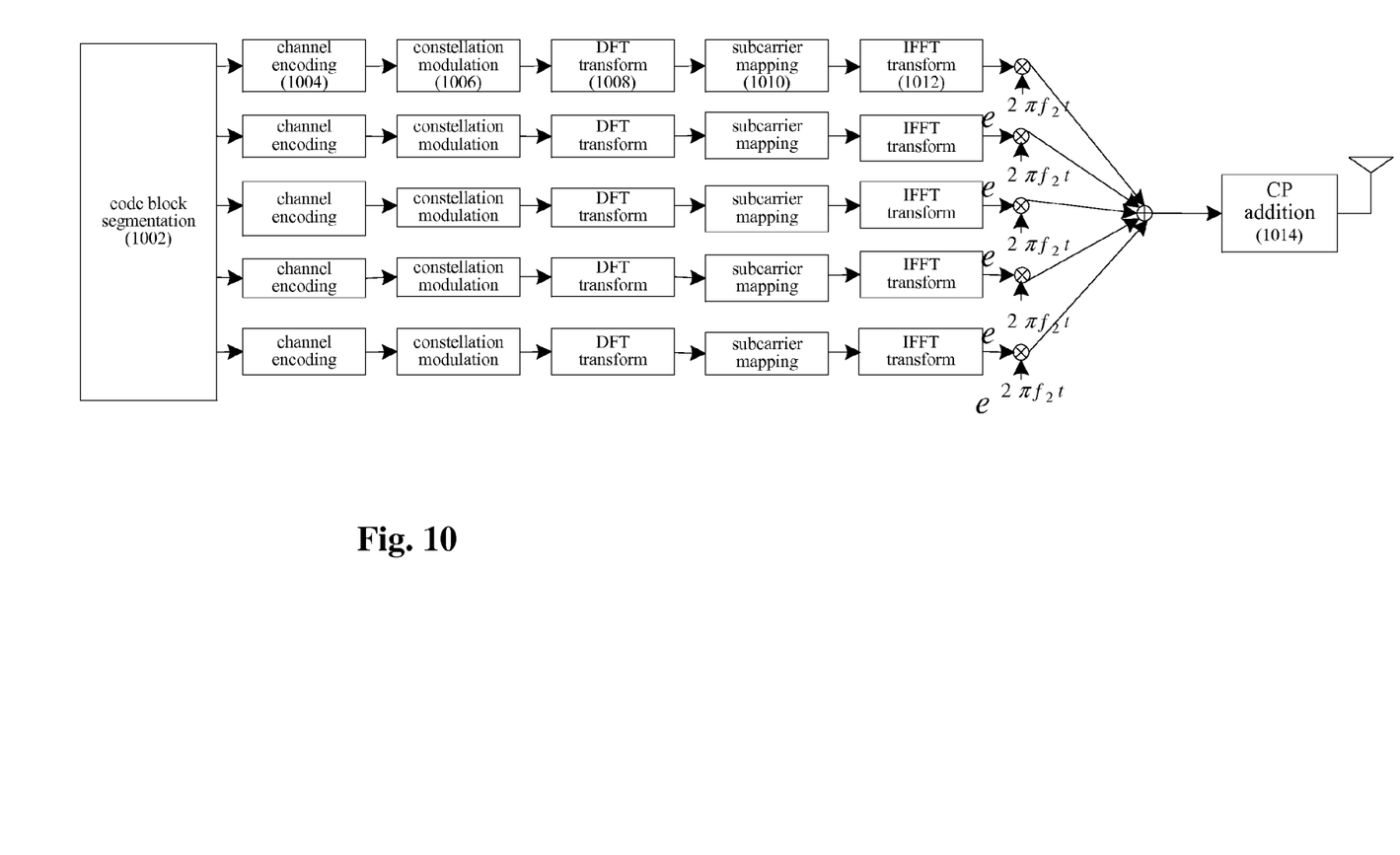
FIG. 10 is a schematic diagram of the structure of an NxSC-FDMA transmitter of the method for multiple frequency point multiple access according to the embodiments of the present invention.

FIG. 7 is a schematic diagram of the structure of a SC-FDMA transmitter. When using a SC-FDMA transmitter to transmit information, it needs to perform the operations such as code block segmentation 702, channel encoding 704, constellation modulation 706, DFT transform 708, subcarrier mapping 710, IFFT transform 712, and CP addition 714 to the information to be transmitted, and finally the information is sent out. FIG. 8 is a schematic diagram of the structure of an OFDMA transmitter. When using an OFDMA transmitter to transmit information, it needs to perform the operations such as code block segmentation 802, channel encoding 804, constellation modulation 806, serial-parallel conversion 808, subcarrier mapping 810, IFFT transform 812, and CP addition 814 to the information to be transmitted, and finally the information is transmitted out. FIG. 9 is a schematic diagram of the structure of a clustered SC-FDMA transmitter. When using a clustered SC-FDMA transmitter to transmit information, it needs to perform the operations such as code block segmentation 902, channel encoding 904, constellation modulation 906, DFT transform 908, subcarrier mapping 910, clustering, IFFT transform 912, and CP addition 914 to the information to be transmitted, and finally the information is transmitted out. FIG. 10 is a schematic diagram of the structure of an NxSC-FDMA transmitter. When using an NxSC-FDMA transmitter to transmit information, it needs to perform the operations such as code block segmentation 1002, channel encoding 1004, constellation modulation 1006, DFT transform 1008, subcarrier mapping 1010, IFFT transform 1012, and after calculation, CP addition 1014 to the information to be transmitted, and finally the information is transmitted out.

The receiver processes the same according to the particular multi-access mode used by the working frequency point in this case. If the information sending of one certain working frequency point uses SC-FDMA, then the receiver performs corresponding work according to the process of SC-FDMA; if the information sending of one certain working frequency point uses OFDMA, then the receiver performs corresponding work according to the process of OFDMA; if the information sending of one certain working frequency point uses clustered SC-FDMA, then the receiver performs corresponding work according to the process of clustered SC-FDMA; if the information sending of one certain working frequency point uses NxSC-FDMA, then the receiver performs corresponding work according to the process of NxSC-FDMA; and if the information sending of one certain working frequency point uses SC-FDMA, OFDMA, clustered SC-FDMA, and NxSC-FDMA simultaneously, then the receiver performs corresponding work according to the process of each multi-access mode.

When downlink, the information sending of Node-B at each working frequency point all preferably uses the form of OFDMA, and the receiver performs corresponding work according to the process of OFDMA.

By way of the above process, the problem that the currently available single multi-access mode is not well suitable for the situation that there are a plurality of working frequency points is solved, and the solution provided by the embodiments of the present invention can be compatible with the old system terminals, which has quite good compatibility and is a simple and effective multiple frequency point multi-access mode.

A computer readable medium is further provided according to the embodiments of the present invention, and the computer readable medium is stored thereon with computer executable instructions. And when these instructions are executed by a computer or processor, they makes the computer or processor to perform the process of steps S102 and S104 as shown in FIG. 1, and preferably, to perform one or more of the above examples.

Apparatus Embodiments

Figure 11:
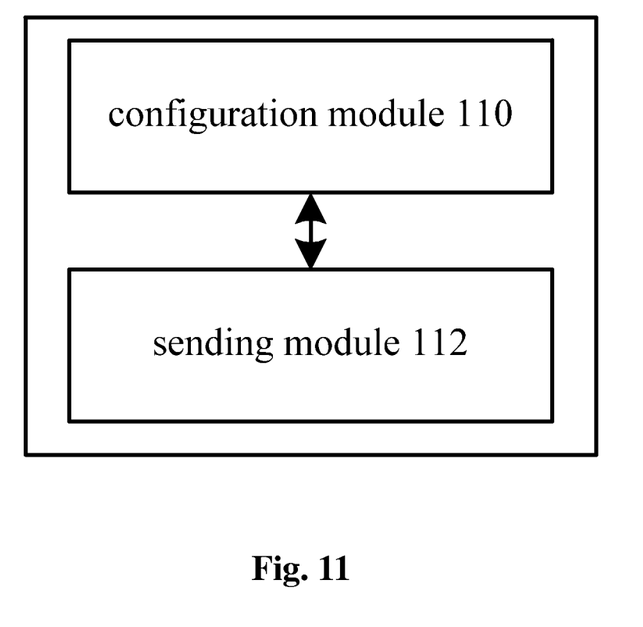
FIG. 11 is a block diagram of an apparatus for multiple frequency point multiple access according to the embodiments of the present invention.

An apparatus for multiple frequency point multiple access is provided according to the embodiments of the present invention, and FIG. 11 is a block diagram of an apparatus for multiple frequency point multiple access according to the embodiments of the present invention, and as shown in FIG. 11, the above apparatus comprises a configuration module 110 and a sending module 112. Each module of this apparatus will be described in detail hereinafter.

The configuration module 110 is adapted for, in the situation that a system comprises a plurality of working frequency points, configuring a multi-access mode for the sending of uplink information and the sending of downlink information of each working frequency point in a plurality of working frequency points respectively; that is, the configuration module 110 configures the information sending of the uplink/downlink information of each working frequency point to be different or the same multi-access mode.

In this case, the multi-access mode is at least one of the following: SC-FDMA, OFDMA, clustered SC-FDMA, and NxSC-FDMA.

During practical application, the configuration module 110 can configure a combined multi-access mode of SC-FDMA, OFDMA, clustered SC-FDMA, and NxSC-FDMA for each working frequency point to send the uplink/downlink information. In particular, the configuration module 110 can configure the information sending at some working frequency points to be SC-FDMA, configure the information sending at some working frequency points to be OFDMA, configure the information sending at some working frequency points to be clustered SC-FDMA, configure the information sending at some working frequency points to be NxSC-FDMA, and configure the information sending at some working frequency points to be SC-FDMA, OFDMA, clustered SC-FDMA, and NxSC-FDMA simultaneously, or, configure the information sending of each working frequency point to be the same multi-access mode.

In addition, in order to be compatible with the old system, as to a terminal which is located in the old system in the terminals, the configuration module 110 can further adjust the current working frequency point to the working frequency point used in the SC-FDMA multi-access mode to send the uplink information and used in the OFDMA multi-access mode to send the downlink information.

In addition, the configuration module 110 further comprises:

an initial access configuration submodule adapted for configuring a predetermined working frequency point in a plurality of working frequency points as an initial access working frequency point of a terminal (for example, the center frequency point or one certain frequency point can be used as the initial access frequency point of the UT in default), wherein the multi-access mode of the uplink information sending of the initial access working frequency point is SC-FDMA, and the multi-access mode of the downlink information sending is OFDMA, and of course it can be the above other multi-access modes, which is not limited by the embodiments of the present invention; and an notification submodule adapted for sending a system message to the terminal after the terminal accesses the initial access working frequency point, wherein the system message carries the multi-access modes used when a plurality of working frequency points send the uplink information and downlink information to enable the terminal to adjust the current working frequency point of the terminal according to the multi-access mode supported by the terminal itself.

In particular, after accessing, according to the system information, the UT can learn that the information sending at some working frequency points uses SC-FDMA, the information sending at some working frequency points uses OFDMA, the information sending at some working frequency points uses clustered SC-FDMA, the information sending at some working frequency points uses NxSC-FDMA, and the information sending at some working frequency points uses SC-FDMA, OFDMA, clustered SC-FDMA, and NxSC-FDMA simultaneously, and the information sending of some working frequency points uses the same multi-access mode.

The sending module 112 is connected to the configuration module 110 and adapted for sending the uplink information and/or sending the downlink information on a plurality of working frequency points according to the multi-access modes configured by the configuration module 110.

In addition, after the configuration module 110 configures the multi-access modes of a plurality of working frequency points, the working frequency points particularly allocated to the original system terminal and new system terminal can be adjusted adaptively, therefore, the above apparatus can further comprises: an allocation module for allocating a plurality of working frequency points to a terminal.

In summary, by way of the technical solution of the present invention, the problem that the currently available single multi-access mode is not completely suitable for the situation that there are a plurality of working frequency points and the problem that the currently available system only considers PAPR and causes the link performance to reduce are solved by configuring different or same multi-access mode for the sending of the uplink/downlink information of each working frequency point. A simple multi-access mode is provided, which ensure the link performance of the working frequency point, improves the throughput of the entire network, and also takes the problem of system PAPR into account.

Furthermore, the implementation of the present invention makes no modification to the system architecture and the current process procedure, which is easy to implement and promote in the technical field and has rather strong industry applicability.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for multiple frequency point multiple access, comprising:
  configuring, in a system that comprises a plurality of working frequency points, an uplink multi-access mode for sending uplink information and a downlink multi-access mode for sending downlink information at each working frequency point in the plurality of working frequency points;
  sending at each working frequency point, one or both of the uplink information according to the uplink multi-access mode and the downlink information according to the downlink multi-access mode;
  allocating the plurality of working frequency points to a terminal;
  configuring a predetermined working frequency point in the plurality of working frequency points as an initial access working frequency point of the terminal; and
  after accessing the initial access working frequency point, acquiring, by the terminal, the uplink multi-access modes and the downlink multi-access modes used by the terminal to send the uplink information and the downlink information at the plurality of working frequency points according to a system message received by the terminal, and adjusting, by the terminal, a current working frequency point of the terminal according to a multi-access mode supported by the terminal,
  wherein the uplink multi-access mode for sending the uplink information at the initial access working frequency point is at least one of single carrier frequency division multiple access (SC-FDMA), orthogonal frequency division multiple access (OFDMA), clustered single carrier frequency division multiple access (clustered SC-FDMA), and NxSC-FDMA and the downlink multi-access mode for sending the downlink information is orthogonal frequency division multiple access (OFDMA), and wherein adjusting the current working frequency point of the terminal comprises adjusting the current working frequency point of the terminal, which is located in an old system, to a new working frequency point that is used in the SC-FDMA multi-access mode to send the uplink information and that is used in the OFDMA multi-access mode to send the downlink information.

2. An apparatus for multiple frequency point multiple access, comprising:

a configuration module that configures, in a system that comprises a plurality of working frequency points, an uplink multi-access mode for sending uplink information and a downlink multi-access mode for sending downlink information at each working frequency point in the plurality of working frequency points;

a sending module that sends one or both of the uplink information according to the uplink multi-access mode configured by the configuration module and the downlink information according to the downlink multi-access mode configured by the configuration module on the plurality of working frequency points;

an allocation module that allocates the plurality of working frequency points to a terminal, an initial access configuration module that configures a predetermined working frequency point in the plurality of working frequency points as an initial access working frequency point of the terminal;

a notification module that sends a system message to a terminal after the terminal accesses the initial access working frequency point, wherein the system message contains data that indicates the uplink multi-access mode and the downlink multi-access mode and wherein the data are used by the terminal to adjust the current working frequency point of the terminal according to a multi-access mode supported by the terminal, wherein the multi-access mode for sending the uplink information at the initial access working frequency point is at least one of single carrier frequency division multiple access (SC-FDMA), orthogonal frequency division multiple access (OFDMA), clustered single carrier frequency division multiple access (clustered SC-FDMA), and NxSC-FDMA and the multi-access mode for sending the downlink information is orthogonal frequency division multiple access (OFDMA), and wherein the allocation module further adjusts the current working frequency point of the terminal, which is located in an old system, to a working frequency point that is used in the SC-FDMA multi-access mode to send the uplink information and that is used in the OFDMA multi-access mode to send the downlink information.

* * * * *